(12) United States Patent
Chuang

(10) Patent No.: US 8,017,847 B1
(45) Date of Patent: Sep. 13, 2011

(54) VIOLIN DISPLAY

(75) Inventor: Kai-Cheng Chuang, Tainan (TW)

(73) Assignee: E Ink Holdings Inc., Hsinchu (TW)

( * ) Notice: Subject to any disclaimer, the term of this patent is extended or adjusted under 35 U.S.C. 154(b) by 0 days.

(21) Appl. No.: 12/851,800

(22) Filed: Aug. 6, 2010

(51) Int. Cl.
*G09B 15/00* (2006.01)
*G09B 15/02* (2006.01)
*G10H 1/00* (2006.01)

(52) U.S. Cl. ........................ 84/477 R; 84/743
(58) Field of Classification Search ............... 84/602, 84/743, 477 R, 485 R
See application file for complete search history.

(56) References Cited

U.S. PATENT DOCUMENTS

| | | | | |
|---|---|---|---|---|
| 5,214,231 | A * | 5/1993 | Ernst et al. | 84/652 |
| 6,162,981 | A * | 12/2000 | Newcomer et al. | 84/485 R |
| 7,521,619 | B2 * | 4/2009 | Salter | 84/477 R |
| 2010/0300260 | A1 * | 12/2010 | Shaffer | 84/314 N |

* cited by examiner

*Primary Examiner* — Jeffrey Donels
(74) *Attorney, Agent, or Firm* — Guice Patents PLLC

(57) ABSTRACT

A violin display, installed on a violin, including: a control device, used to output a fingering lines pattern data; and a fingerboard display, installed on the fingerboard of the violin to display an image corresponding to the fingering lines pattern data.

10 Claims, 2 Drawing Sheets

VIOLIN DISPLAY

BACKGROUND OF THE INVENTION

1. Field of the Invention

The present invention relates to a violin display, especially to a violin display which can show fingering positions on the fingerboard of a violin to facilitate a user to play specific notes on the violin.

2. Description of the Related Art

As is known, the beginners of violin, viola, or cello often use stripped tapes to mark fingering lines—indicating where to place their fingers—on the fingerboard to facilitate practicing, and, as different patterns of the fingering lines are needed for different learning stages, the beginners have to change the locations of the stripped tapes when advancing to another learning stage. However, the changing of the stripped tapes is not convenient at all, and the sticky traces of the removed stripped tapes not only cause uncomfortable feeling when touched by fingers, but also destroy the aesthetic of the violin.

In view of the disadvantages mentioned above, the present invention proposes a violin display, which can show a fingering lines pattern according to the user's need.

SUMMARY OF THE INVENTION

One objective of the present invention is to disclose a violin display, which can be installed on the fingerboard of a violin to show a fingering lines pattern according to the user's need.

Another objective of the present invention is to disclose a violin display, which can show the note of the sound produced by the violin.

Still another objective of the present invention is to disclose a violin display, which can record the sound of a violin in a performance.

To attain the foregoing objectives, the present invention proposes a violin display, which is installed on a violin, including: an input module, used to output a sensing signal in response to a pressing input; an audio signal processing unit, having a note detection unit to generate a note data according to the note of the sound produced by the violin, and a sound recording unit to generate a record file of a performance; a display panel, used to display an operation options table or an image corresponding to the note data; a fingerboard display, installed on the fingerboard of the violin and used to display an image of a fingering lines pattern; a USB interface, used for an external USB device to download the record file; and a control unit, coupled with the input module, the audio signal processing unit, the display panel, the fingerboard display, and the USB interface respectively, to response to the sensing signal by outputting the note data to the display panel, outputting a fingering lines pattern data to the fingerboard display to show the image of the fingering lines pattern, or outputting the record file via the USB interface.

Thanks to the novel design, the present invention can provide the following functions:

1. As the violin display of the present invention can display a fingering lines pattern according to the user's need, the troublesome effort of changing the stripped tapes on the fingerboard can be eliminated.
2. The violin display of the present invention can match with the fingerboard so as not to destroy the aesthetic of the violin.
3. The violin display of the present invention can display the note of the sound produced by the violin to help users confirm their performance.
4. The violin display of the present invention can maintain the display of a fingering lines pattern without consuming power for a long time by utilizing an electronic paper—having the advantage of maintaining an image without power consumption.
5. The violin display of the present invention can record the sound produced by the violin in a performance, and the record file can be downloaded via a USB interface to help users improve their performance skill.

To make it easier for our examiner to understand the objective of the invention, its structure, innovative features, and performance, we use a preferred embodiment together with the accompanying drawings for the detailed description of the invention.

DETAILED DESCRIPTION OF THE PREFERRED EMBODIMENTS

The present invention will be described in more detail hereinafter with reference to the accompanying drawings that show the preferred embodiment of the invention.

Figure 1:
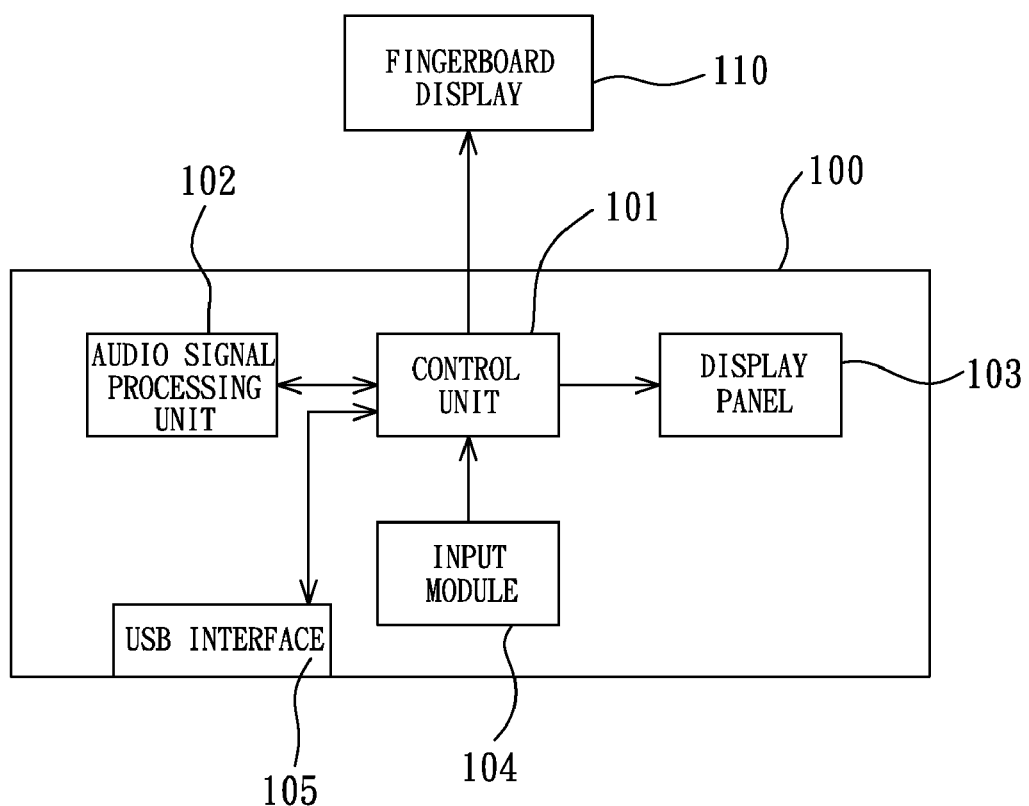
FIG. 1 illustrates the block diagram of a violin display according to a preferred embodiment of the present invention.

Please refer to FIG. 1, which illustrates the block diagram of a violin display according to a preferred embodiment of the present invention. As illustrated in FIG. 1, the violin display includes a control device 100 and a fingerboard display 110, wherein the control device 100 has a control unit 101, an audio signal processing unit 102, a display panel 103, an input module 104, and a USB interface 105.

The control unit 101 determines its operation modes according to a sensing signal from the input module 104. The operation modes include: transmitting a fingering lines pattern data to the fingerboard display 110; driving the audio signal processing unit 102 to execute note detection; driving the audio signal processing unit 102 to execute sound recording; transmitting an image of operation options to the display panel 103; transmitting a note data to the display panel 103; and driving the USB interface 105 to facilitate downloading a record file to an external USB device. The control unit 101 is preferably implemented with a micro controller.

The audio signal processing unit 102 has a note detection unit and a sound recording unit for executing note detection and/or sound recording to generate the note data and/or the record file, under the control of the control unit 101.

The display panel 103 is used to: display the operation options for users to choose the operation modes by operating the input module 104; or display the note according to the note data. The operation options include: transmitting the fingering lines pattern data; executing note detection; executing sound recording; transmitting the note data; and downloading the record file. The display panel 103 can be implemented with an electrophoresis display, a MEMS (Micro Electro Mechanical Systems) display, a cholesteric liquid crystal display, an electrwetting display, or a liquid crystal display.

The input module 104, which can be a keyboard device or a touch module, is used to output the sensing signal in response to a pressing input. The touch module can be implemented with a resistive touch module, a capacitive touch module, an optics touch module, a surface acoustic wave touch module, or a force sensing touch module.

The USB interface 105 is used for an external USB device to download a record file therefrom, and the users can then listen to their performance by replaying the record file so as to improve their performance skills. The external USB device can be a MP3 or MP4 device. The USB interface 105 can also be replaced by a wireless interface, for example, an IR interface or a Bluetooth interface.

The fingerboard display 110 is used to display an image according to the fingering lines pattern data. The fingerboard display 110 can be implemented with an electrophoresis display, a MEMS (Micro Electro Mechanical Systems) display, a cholesteric liquid crystal display, an electrwetting display, or a liquid crystal display.

Figure 2:
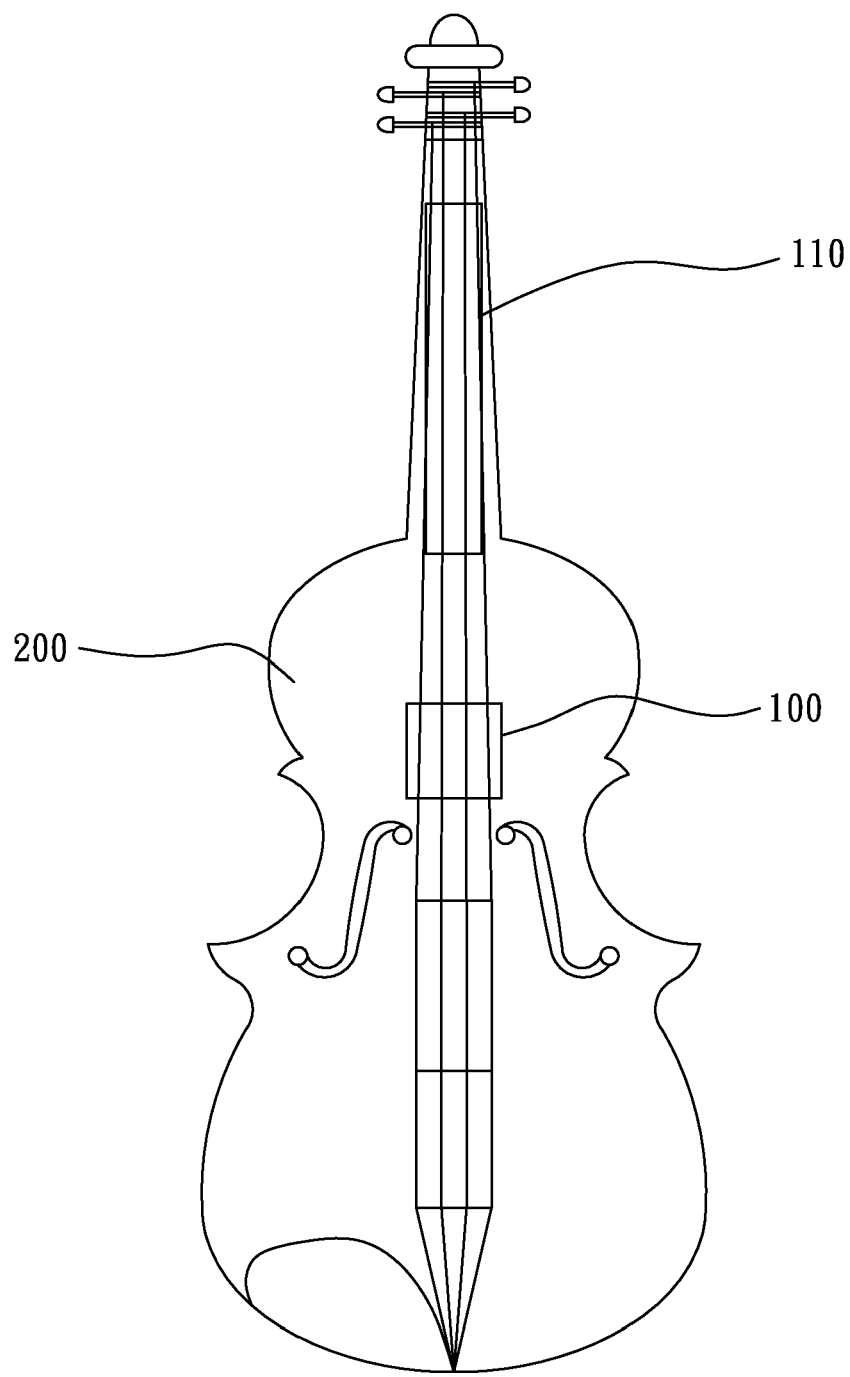
FIG. 2 illustrates a violin installed with a violin display according to a preferred embodiment of the present invention.

FIG. 2 illustrates a violin 200 installed with a violin display according to a preferred embodiment of the present invention. As illustrated in FIG. 2, the control device 100 is placed approximately at the center of the violin 200, and the fingerboard display 110 is placed on the fingerboard of the violin 200. The user, by operating the control device 100, can make the fingerboard display 110 show a fingering lines pattern to meet the needs of different learning stages; make the control device 100 display a detected note; execute sound recording; or download a record file.

In conclusion, the violin display of the present invention not only can change the fingering lines pattern according to the user's need, but also can display the note of the sound produced by the violin, and/or record the sound in a performance. As such, the present invention not only prevents the disadvantages involved in the learning process of the violin beginners, but also offers extra benefits.

While the invention has been described by way of example and in terms of a preferred embodiment, it is to be understood that the invention is not limited thereto. To the contrary, it is intended to cover various modifications and similar arrangements and procedures—for example, changing the location of the control device 100 on the violin, or replacing the fingerboard display 110 with a LED module, and the scope of the appended claims therefore should be accorded the broadest interpretation so as to encompass all such modifications and similar arrangements and procedures.

In summation of the above description, the present invention herein enhances the performance over the conventional structure and further complies with the patent application requirements and is submitted to the Patent and Trademark Office for review and granting of the commensurate patent rights.

What is claimed is:

1. A violin assembly comprising:
   a violin;
   a control device located in a center portion of the violin and used to output a fingering lines pattern data; and
   a fingerboard display installed on a fingerboard of said violin and being used to display an image corresponding to said fingering lines pattern data.

2. The violin display as claim 1, wherein said control device comprising:
   an input module, used to output a sensing signal in response to a pressing input; and
   a control unit, coupled with said input module to determine said fingering lines pattern data according to said sensing signal.

3. The violin display as claim 2, wherein said input module includes a keyboard device.

4. The violin display as claim 2, wherein said input module is a module selected from the group consisting of a resistive touch module, a capacitive touch module, an optics touch module, a surface acoustic wave touch module, and a force sensing touch module.

5. The violin display as claim 2, wherein said control unit includes a micro controller.

6. The violin display as claim 1, wherein said fingerboard display is a display selected from the group consisting of an electrophoresis display, a MEMS display, a cholesteric liquid crystal display, an electrowetting display, and a liquid crystal display.

7. A violin assembly comprising:
   a violin;
   a control device located in a center portion of the violin and including an input module, an audio signal processing unit, a finger board display and a control unit;
   the input module is used for outputting a sensing signal in response to a pressing input;
   the audio signal processing unit having a note detection unit for generating a note data according to the note of the sound produced by said violin;
   the display panel is used to display an operation options table or an image corresponding to said note data;
   the fingerboard display is located on the fingerboard of said violin and is used to display an image of a fingering lines pattern; and
   the control unit is coupled with said input module, said audio signal processing unit, said display panel, and said fingerboard display respectively, and responding to said sensing signal and delivering said note data to said display panel, or delivering a fingering lines pattern data to said fingerboard display to show the image of said fingering lines pattern.

8. The violin display as claim 7, wherein said audio signal processing unit further comprises a sound recording unit.

9. The violin display as claim 7, further comprising an interface selected from a group consisting of a USB interface and a wireless interface.

10. The violin display as claim 7, wherein said fingerboard display is a display selected from the group consisting of an electrophoresis display, a MEMS display, a cholesteric liquid crystal display, an electrowetting display, and a liquid crystal display.

* * * * *